(12) United States Patent
Files et al.

(10) Patent No.: US 11,657,186 B2
(45) Date of Patent: May 23, 2023

(54) PRIVACY SHIELD DESIGN AND PLACEMENT IN AN INFORMATION HANDLING SYSTEM (IHS)

(71) Applicant: Dell Products, L.P., Round Rock, TX (US)

(72) Inventors: Jace W. Files, Round Rock, TX (US); John Trevor Morrison, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 22 days.

(21) Appl. No.: 17/392,347

(22) Filed: Aug. 3, 2021

(65) Prior Publication Data

US 2023/0043837 A1 Feb. 9, 2023

(51) Int. Cl.
| | |
|---|---|
| H04N 5/225 | (2006.01) |
| G06F 21/82 | (2013.01) |
| G06F 21/83 | (2013.01) |
| G06F 21/62 | (2013.01) |
| H04N 23/55 | (2023.01) |
| H01L 51/52 | (2006.01) |

(52) U.S. Cl.
CPC .......... *G06F 21/83* (2013.01); *G06F 21/6245* (2013.01); *H04N 23/55* (2023.01); *H01L 51/5237* (2013.01)

(58) Field of Classification Search
CPC .... H04N 5/2254; H04N 5/2257; H04N 23/55; H04N 23/57; H04M 1/0264; G06F 21/82–88; H01L 27/3225

USPC ......................................................... 348/375
See application file for complete search history.

(56) References Cited

U.S. PATENT DOCUMENTS

| | | | |
|---|---|---|---|
| 10,382,660 B2 | 8/2019 | Files et al. | |
| 10,425,565 B1 | 9/2019 | Files et al. | |
| 2006/0077279 A1* | 4/2006 | Kang | G02B 13/0075 |
| | | | 348/335 |
| 2009/0033756 A1 | 2/2009 | Kamatani et al. | |
| 2010/0164344 A1 | 7/2010 | Boerner et al. | |
| 2014/0267848 A1* | 9/2014 | Wu | H04N 5/335 |
| | | | 348/277 |
| 2014/0286008 A1 | 9/2014 | Hack et al. | |
| 2014/0347555 A1 | 11/2014 | Hirakata et al. | |
| 2015/0009398 A1* | 1/2015 | Shih | H04N 5/2354 |
| | | | 348/370 |
| 2015/0172522 A1 | 6/2015 | O'Neill et al. | |
| 2016/0323518 A1 | 11/2016 | Rivard et al. | |
| 2017/0124942 A1 | 5/2017 | Evans, V et al. | |
| 2019/0042769 A1* | 2/2019 | Sukhomlinov | G06F 21/604 |
| 2019/0281200 A1* | 9/2019 | Files | H04N 7/142 |
| 2020/0328239 A1* | 10/2020 | Yen | H01L 27/14603 |
| 2021/0134875 A1* | 5/2021 | Lu | H01L 31/02363 |

* cited by examiner

*Primary Examiner* — Anthony J Daniels
(74) *Attorney, Agent, or Firm* — Fogarty LLP (57) ABSTRACT

Embodiments of systems and methods for privacy shield design and placement in an Information Handling System (IHS) are described. In some embodiments, a privacy shield may include a film configured to emit light and a circular aperture in the film, such that the privacy shield is configured to be deployed in front of a lens of a camera coupled to an IHS.

17 Claims, 4 Drawing Sheets

PRIVACY SHIELD DESIGN AND PLACEMENT IN AN INFORMATION HANDLING SYSTEM (IHS)

FIELD

The present disclosure relates generally to Information Handling Systems (IHSs), and more particularly, to privacy shield design and placement in an IHS.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of privacy shield design and placement in an Information Handling System (IHS) are described. In an illustrative, non-limiting embodiment, a privacy shield may include a film configured to emit light and a circular aperture in the film, such that the privacy shield is configured to be deployed in front of a lens of a camera coupled to an IHS.

The film may include an organic light emitting diode (OLED) film, and the circular aperture may include at least one of: glass, plastic, or a transparent material. The diameter of the circular aperture may be selected, at least in part, based upon an angular field of view of the camera. The lens may include a convex lens and/or a concave lens. The film may be configured to emit light in response to activation of a private mode of operation.

The light may be configured to saturate an image sensor deployed behind the lens. The privacy shield may be configured to be deployed at a selected distance from a focal point of the lens. The focal point may be at a center of the lens. Additionally, or alternatively, the focal point may be between the lens and an image sensor.

The selected distance may be chosen, at least in part, based upon an angular field of view of the camera. Additionally, or alternatively, the selected distance may be chosen, at least in part, based upon a focal length of the lens. Moreover, the focal length may include an effective focal length of a plurality of lenses.

In some cases, the privacy shield may be configured to be coupled to an electronic motor configured to change the focal length of the lens. For example, the electronic motor may be configured to change the distance as part of an auto-focus adjustment. Additionally, or alternatively, the electronic motor may be configured to change the distance as part of a zoom adjustment.

In another illustrative, non-limiting embodiment, an Information Handling System (IHS) may include: a processor; a camera coupled to the processor, the camera comprising a lens and an image sensor positioned behind the lens; and a privacy shield coupled to the camera, the privacy shield comprising: a film configured to emit light in response to activation of a privacy feature by the processor; and a circular aperture in the film, where the privacy shield is positioned in front of the lens at a distance from a focal point of the lens selected based upon a focal length of the lens.

In yet another illustrative, non-limiting embodiment, a method may include: coupling a camera to an Information Handling System (IHS), the camera comprising a lens and an image sensor positioned behind the lens; and coupling a privacy shield to the IHS, the privacy shield comprising: a film configured to emit light in response to activation of a privacy feature; and a circular aperture in the film, where the privacy shield is positioned in front of the lens at a distance from a focal point of the lens selected based upon a focal length of the lens.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Many computer users may employ a camera for certain types of applications, such as videoconferencing. To facilitate this, many modern computing devices, such as laptop computing devices, tablet computing devices, and wireless phones, integrate at least one (e.g., forward-facing) camera and sometimes two (e.g., forward-facing and rear-facing) cameras. In addition, users of a desktop computing device, for example, may also connect an external camera suitable for applications such as videoconferencing.

Some of the major concerns for users of computing devices that have a camera connected thereto include security and privacy, because such cameras have been known to be hijacked by unauthorized parties, hackers, etc. For example, a hacker may remotely hijack a camera of a computing device to view confidential information (e.g., the user's username and password) or to surreptitiously captures images (e.g., photographs or video) of the user in a potentially compromising situation.

Because of how easily a camera connected to a computing device can be hijacked, many users take security precautions when they are not using the camera. For example, the security precautions may prevent hackers from viewing or recording information even if the hackers manage to hijack the camera. Typically, these security precautions are crude, such as manually placing an opaque sticker over the camera. In addition, such solutions rely on the user remembering to manually perform the security precaution. If the user forgets to take the security precaution (e.g., because the user is pressed for time etc.), however, then the user's camera may be vulnerable to being hijacked.

To address these, and other concerns, systems and methods described herein may use a privacy shield having a light source configured to saturate a sensor of a camera that is integrated into (or connected to) a computing device. Saturating the camera sensor may provide a security or privacy feature that prevents a hacker from discerning meaningful information from image data provided by the overloaded sensor even if the hacker is able to hijack the camera. The sensor may be saturated sufficiently that image data provided by the sensor is undecipherable. For example, when saturated, the image data may be a snow-like pattern, a monochrome image (e.g., a white image, a black image, or the like), or undecipherable shapes or symbols.

The saturation is sufficient to prevent a hacker viewing the image data from the hijacked camera from viewing or capturing any usable information. For example, the hacker viewing the image data from the saturated sensor may be unable to discern what action(s) the user is performing and may therefore be unable to view passwords or other confidential information that the user is entering. Similarly, the hacker may be unable to capture viewable images or video of the user in a potentially compromising situation. When the camera's sensor is saturated, images or video captured by the hijacked camera may only include unrecognizable shapes.

The light emitted by the light source may include visible spectrum light to enable the user to visually confirm that the security feature (e.g., saturating the camera sensor) is on. For example, when the security feature is on, the user may see a color (e.g., red, green, white, or another color) that indicates that the light source is currently on and saturating the camera sensor. Thus, if the user desires to turn off the security feature to use the camera, the user can visually confirm that the security feature has been turned off by observing that the color is no longer visible.

In some cases, the light source may emit light in the visible spectrum in combination with other light components (e.g., infrared, ultraviolet, or the like) that are not visible to the human eye. For example, the visible spectrum portion of the light from the light source may provide the color indicator indicating that the security feature is enabled, and the non-visible spectrum portion of the light from the light source, in combination with the visible light, may saturate the sensor.

The privacy shield may be integrated into IHSs of any form-factor (e.g., a tablet, a phone, a laptop, or the like). Alternatively, the privacy shield may be integrated into a standalone camera that is connected to the IHS (e.g., a desktop computing device or a laptop computing device that does not have an integrated camera).

In some cases, the light source may include an organic light emitting diode (OLED) film. For example, the OLED film may be deployed in front of the camera lens to saturate the camera sensor. In some implementations, a thin (0.2 mm or less) film may be deployed at a selected and/or configurable distance from the camera lens.

The OLED film may be transparent, and it include a circular aperture having a diameter such that the presence of privacy shield at the selected and/or configurable distance does not affect the image quality of the lens when the OLED film is turned on. In the absence of such circular aperture, the light transmittance through an OLED film, even when the film is transparent, may be negatively affected. Accordingly, in some cases, the diameter of a circular aperture may be selected based upon an angular field of view of the camera (e.g., a "worst-case scenario" or largest achievable angular field).

While the perimeter of the aperture in the OLED film may be circular, the outer perimeter of the film itself may have any suitable shape (e.g., circular, square, or regular, etc.). For example, when the OLED firm is a square, the diagonal of the square may be approximately equal to the diameter of the lens, and the circular aperture may be concentric with the lens.

Applying power to the OLED film may cause the OLED film to emit sufficient light and to saturate the camera sensor. The light may also provide the user with a visual indication that the security feature (e.g., saturating the sensor) is enabled.

In some cases, the privacy shield may be manufactured with capacitive touch properties. For example, the user may touch the privacy shield to turn the security feature on or off. When the OLED film is not emitting light, the user may touch the privacy shield to power the OLED film, and the OLED film responds by emitting light (e.g., security feature is on). When the OLED film is emitting light, the user may touch the privacy shield to stop powering the OLED film, which then responds by no longer emitting light (e.g., security feature is off).

The security feature may be turned on and off manually by the user or automatically by software applications. For example, the user may use an application (e.g., a control panel) to manually turn the security feature on or off.

In addition, the security feature may be automatically (e.g., without human interaction) controlled by software applications. For example, during a login process, the IHS's operating system (OS) may automatically (e.g., without human interaction) disable the security feature to enable the camera to be used for login using a facial recognition application.

After the login is completed, the OS may check a settings file and then set the security feature on or off based on the settings file. For example, if the settings file indicates that the security feature is to be on (e.g., default setting), then, after the login process has been completed, the OS may turn the security feature on. When the user starts a type of application that uses the camera (e.g., a videoconferencing application, an image capture application used to capture photos or videos using the camera, or the like), the application may automatically turn off the security feature and/or it may request the OS that the security feature be turned off.

The settings file may include one or more of a default setting, a user-specified setting, or an override setting. The default setting may be a setting that is used when neither a user-specified setting nor an override setting is present in the settings file. The user-specified setting may be any setting that the user selects. For example, a user who is concerned about security may set the user setting to "security feature on" such that the security feature is on except when turned off by the operating system (e.g., during login) or by an application, such as a video conferencing or image capture application. The override setting may be a setting specified by an information technology (IT) department of an enterprise and used for computing devices provided to employees by the enterprise. For example, the enterprise may specify an override setting that the security feature remain on except when the camera is used for corporate videoconferencing.

As another example, the enterprise may specify an override setting that the security feature remain on in certain locations. The OS may use a global positioning satellite (GPS) sensor or other mechanism built into the computing device to determine a location of the computing device. The settings file may identify locations (e.g., where confidential information that should not be made public is present) where the security feature is to be on and where the user is unable to manually turn off the security feature. For example, the override settings may turn the security feature on and prevent the user and applications from turning off the security feature in a research lab where intellectual property is being developed or where other confidential information is present. After the user exits the research lab and goes to a meeting room, the user may manually turn off the security feature or launch an application that turns off the security feature. In this way, the enterprise may (i) protect against industrial espionage, and (ii) prevent others (e.g., hackers) from learning access codes to the enterprise's internal systems and networks.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or video display. An IHS may also include one or more buses operable to transmit communications between the various hardware components.

Figure 1:
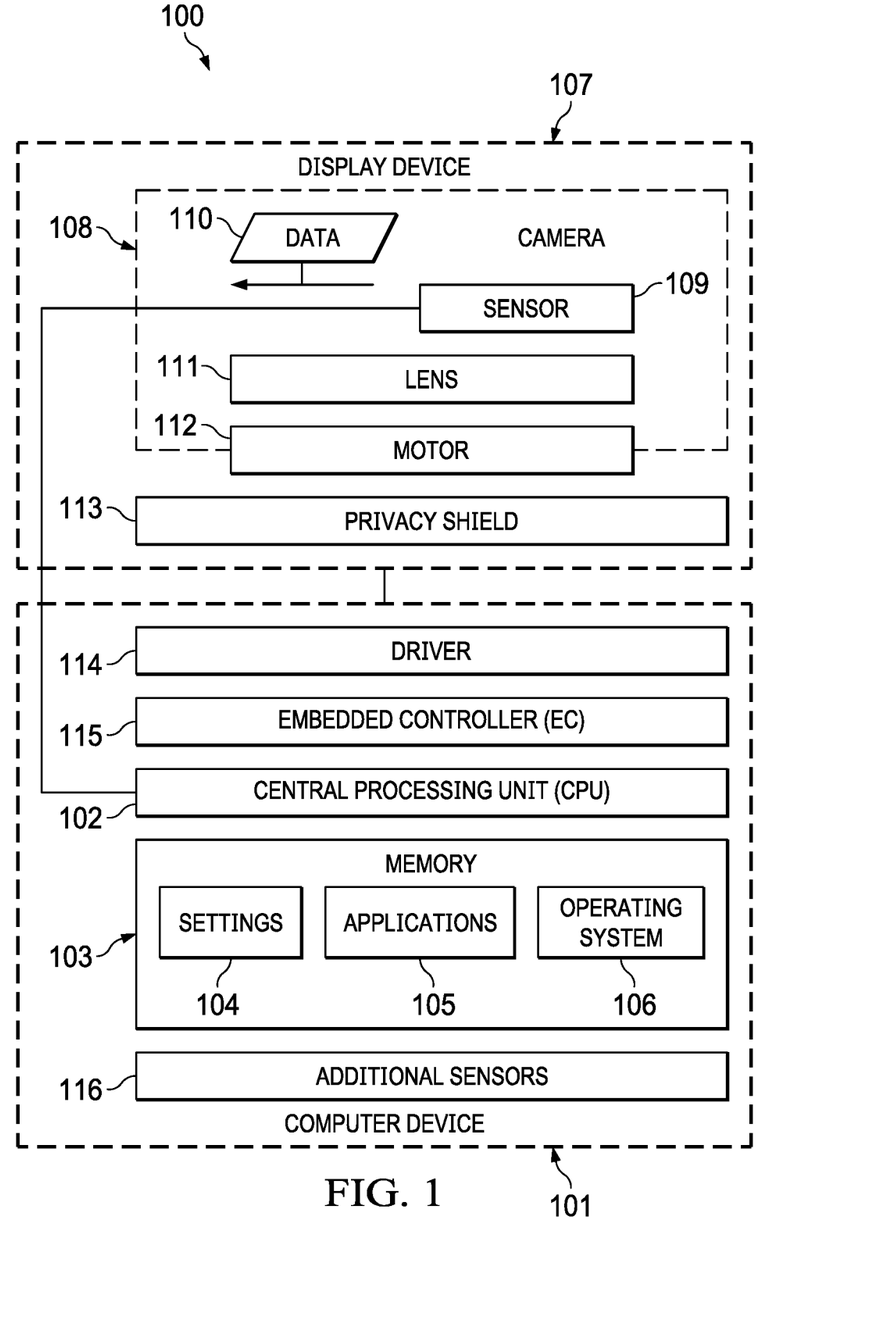
FIG. 1 is a block diagram of an example of an Information Handling System (IHS) having a privacy shield, according to some embodiments.

FIG. 1 is a block diagram of IHS 100 that includes privacy shield 113, according to some embodiments. Computing device 101 may be connected to display device 107. For example, when IHS 100 is implemented as a desktop computer, display device 107 may be in a first housing and computing device 101 may be in a second housing that is separate from the first housing. In a laptop computer, the display device 107 may be in a first housing and the computing device 102 may be in a second housing coupled to the first housing. In a tablet computer or wireless phone, display device 107 may be integrated with computing device 101 in a single housing.

Figure 6:
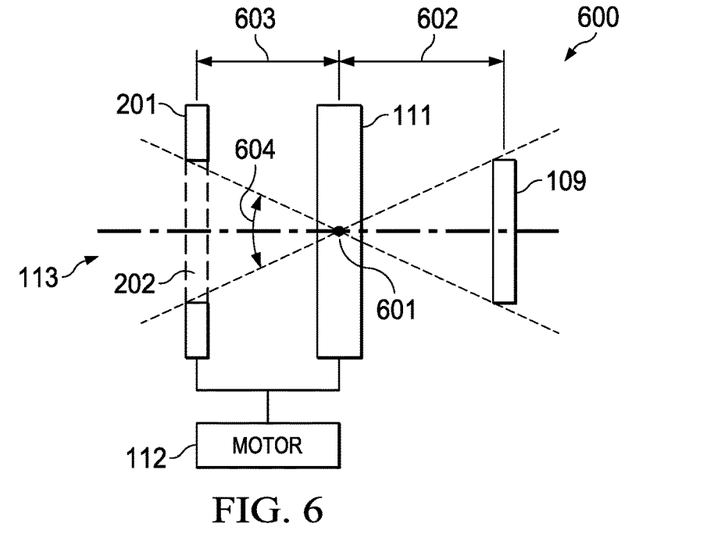
FIG. 6 is a block diagram illustrating an example of placement of a privacy shield, according to some embodiments.

Display device 107 may include camera 108 and privacy shield 113. Camera 108 may include concave or convex lens 111 and sensor 109 that receives an image (or series of images in the case of video) from lens 111 and converts the image (or series of images) into digital image data 110 that is sent to computing device 101 for storage and/or transmission to another computing device. Camera 108 (or lens 111 itself) may also include motor 112 (e.g., a Voice Coil Motor or "VCM") configured to execute auto-focus and/or zoom adjustments, at least in part, by changing the physical distance between lens 111 and sensor 109, and/or between different lenses arranged in series. In some cases, privacy shield 113 may be coupled to motor 112, as shown in FIG. 6.

Camera 108 may be integrated into display device 107 or it may be a standalone device that is connected (e.g., using Universal Serial Bus (USB), Bluetooth, or the like) to computing device 101. While a single camera is illustrated, systems and methods described herein may also be used with a computing device to which multiple cameras are connected. For example, in some cases, a tablet computing device or wireless phone may have both a front-facing camera and a rear-facing camera. In such cases, the systems and methods described herein to provide security may be used on one or both cameras.

Computing device 101 may include Central Processing Unit (CPU) 102, memory 103, Embedded Controller (EC), and hardware driver 114 coupled to privacy shield 113. Memory 103 may include one or more settings 104 (e.g., default setting, user setting, override setting, and the like), one or more software applications 105 (e.g., image capture application, videoconferencing application, and the like), and an operating system (OS) 106 (e.g., Windows, Android, Linux, MacOS, or the like).

Applications 105 and operating system 106 may include software instructions that are executable by CPU 102. Computing device 101 may include one or more additional sensors 116, such as a location sensor that can provide determine a location of computing device 101.

EC 115 may receive instructions from CPU 102. These instructions may cause EC 115 to provide power to privacy shield 113, in response to which a light source (e.g., an OLED film) of privacy shield 113 emits light and saturates sensor 109, thereby preventing a hacker from capturing or viewing useful information from data 110 if the hacker hijacks camera 108. For example, EC 115 may provide power to driver 114, causing privacy shield 113 to emit light. Subsequent instructions may cause EC 115 to stop providing power to privacy shield 113, in response to which the light source stops emitting light to enable normal use of camera 108.

EC 115 may control a security feature that causes privacy shield 113 to emit light (or stop emitting light) near lens 111. The light emitted by privacy shield 113 may be sufficient to saturate image sensor 109. Thus, the security feature is enabled (on) when power is provided to the light source within privacy shield 113, causing the light source to emit enough light to saturate sensor 109. The security feature is disabled (off) when power is not provided to the light source within privacy shield 113, causing the light source to not emit light, thus enabling sensor 109 to provide digital image data for use by applications 105 or OS 106.

Saturating sensor 109 may activate the security feature to prevent a hacker from discerning meaningful information from the image data 110 provided by an overloaded sensor 109 even if the hacker is able to hijack camera 108. Sensor 109 may be saturated sufficiently that image data 110 is undecipherable. For example, when saturated, image data 110 may be a snow-like pattern, a monochrome image (e.g., a white image, a black image, or the like), or undecipherable shapes. The saturation is sufficient to prevent a hacker viewing image data 110 from the hijacked camera 108 from viewing or capturing any usable information.

For example, a hacker viewing image data 110 from a saturated sensor 109 may be unable to discern what action(s) the user is performing and may therefore be unable to view passwords or other confidential information that the user is entering. Similarly, the hacker may be unable to capture usable images or video of the user in a potentially compromising situation because when the camera's sensor 109 is saturated, image data 110 captured by a hijacked camera 108 may only include unrecognizable shapes.

The light emitted by privacy shield 113 may include visible spectrum light (e.g., in the range of about 430 to about 770 THz) to enable the user to visually confirm that the security feature (e.g., saturating the camera sensor) is on. For example, when the security feature is on, the user may see a color indication (e.g., red, green, white, or another color) that privacy shield 113 is currently on and saturating camera sensor 109. Thus, if the user desires to turn off the security feature (e.g., to use the camera 108), the user can visually confirm that the security feature has been turned off by observing that the color indicator is no longer visible, because the light source 108 is no longer receiving power and therefore no longer emitting light.

In some cases, privacy shield 113 may emit both visible spectrum and spectrum that is not visible to the human eye, such as infrared (from about 430 Terahertz (THz) to about 300 Gigahertz (Ghz)) or ultraviolet (from about 30 Petahertz (PHz) to about 750 THz). For example, the visible spectrum portion of the light from privacy shield 113 may provide the color indicator indicating that the security feature is enabled and the non-visible spectrum portion of the light from privacy shield 113 may, in combination with the visible light, be sufficient to saturate camera sensor 109.

In some embodiments, the light source of privacy shield 113 may include one or more LEDs or the like. In other embodiments, the light source may include an OLED film (e.g., a single-pixel film) and driver 114 may include an OLED driver.

Privacy shield 113 may be deployed in front of lens 111 at a selected distance. In some cases, if deploying privacy shield 113 at a given distance from lens 111 does not discernably or measurably degrade an image quality of the data 110, then privacy shield 113 may be deployed at that distance. "Discernably" means a user is unable to see a difference between a first image taken when privacy shield 113 is deployed and a second image taken when privacy shield 113 is deployed. "Measurably" means a first image taken when privacy shield 113 is not deployed may be determined to differ from a second image taken when privacy shield 113 is deployed by less than a predetermined amount.

Figure 2:
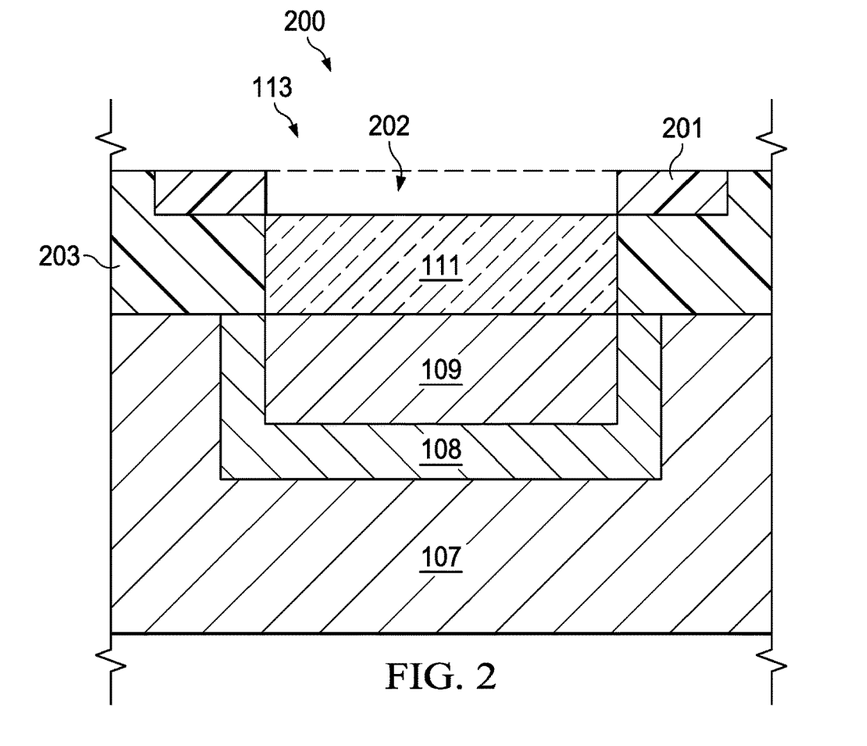
FIGS. 2 and 3 are block diagrams of side and front views, respectively, of an example of a display device that includes a privacy shield placed in front of a camera lens, according to some embodiments.
Figure 3:
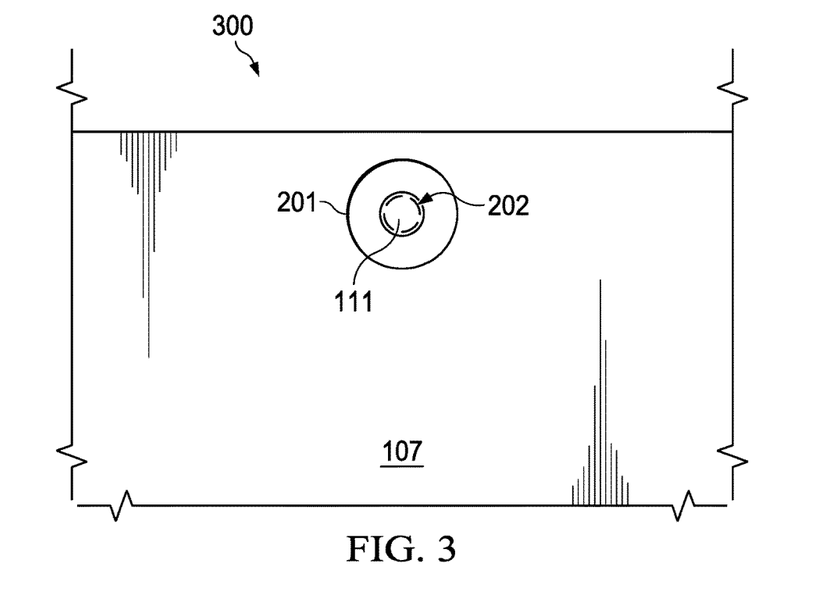

FIGS. 2 and 3 are block diagrams of side and front views 200 and 300, respectively, of display device 107 including privacy shield 113 placed in front of camera lens 111, according to some embodiments. In some implementations, OLED film 201 may be no more than 0.2 millimeters (mm) thick. OLED film 201 may be deployed in front of lens 111 at a selected distance such that it does not observably or measurably degrade image data 110 when the security feature is turned off.

Display device 107 may include surface 203, such as a bezel or a glass (or clear plastic). If surface 203 is a bezel of display device 107, surface 203 may have an opening (e.g., a hole) through which lens 111 passes. If the surface 203 is a transparent material, such as glass or clear plastic, lens 111 may be located just below surface 203.

OLED film 201 may be deployed in front of lens 111, as illustrated in diagrams 200 and 300, but at a selected physical distance from lens 111 (e.g., along a concentric, shared, or common axis) as illustrated in FIG. 6. For example, OLED 201 may be geometrically shaped, such as a circular shape with a diameter that is equal to or greater than that of lens 111. After deploying privacy shield 113, lens 111 may be entirely or mostly covered by OLED film 201.

Figure 4:
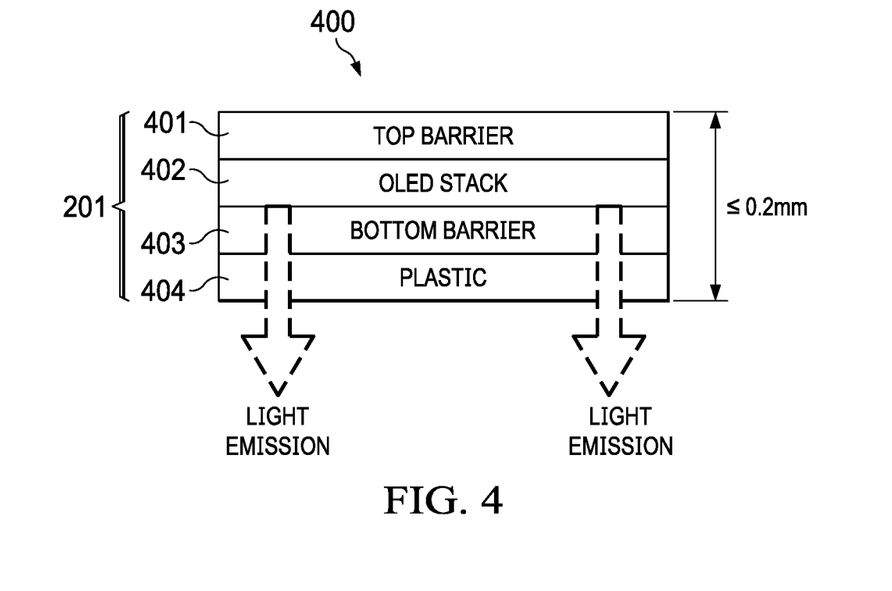
FIG. 4 is a block diagram illustrating an example of an OLED film, according to some embodiments.

FIG. 4 is a block diagram illustrating OLED film 201 according to some embodiments. For example, OLED film 201 may have several layers, including top moisture barrier 401, OLED stack 402, bottom moisture barrier 403, and plastic (e.g., polyethylene naphthalate or similar) 404. The total width of OLED sheet 201 may be 0.2 mm or less. OLED stack 402 may be about 100-200 nanometers (nm) in width.

Moisture barriers 401 and 403 may be made of plastic (e.g., polyethylene or the like), polymer-based barrier, atomic layer deposition (ALD), or another type of moisture barrier suitable for OLED. The light emitted by the OLED stack 402 may travel through bottom moisture barrier 403 and plastic 404. Plastic 404 may be transparent or translucent to enable light from the OLED stack 402 to be transmitted through plastic 404.

Figure 5:
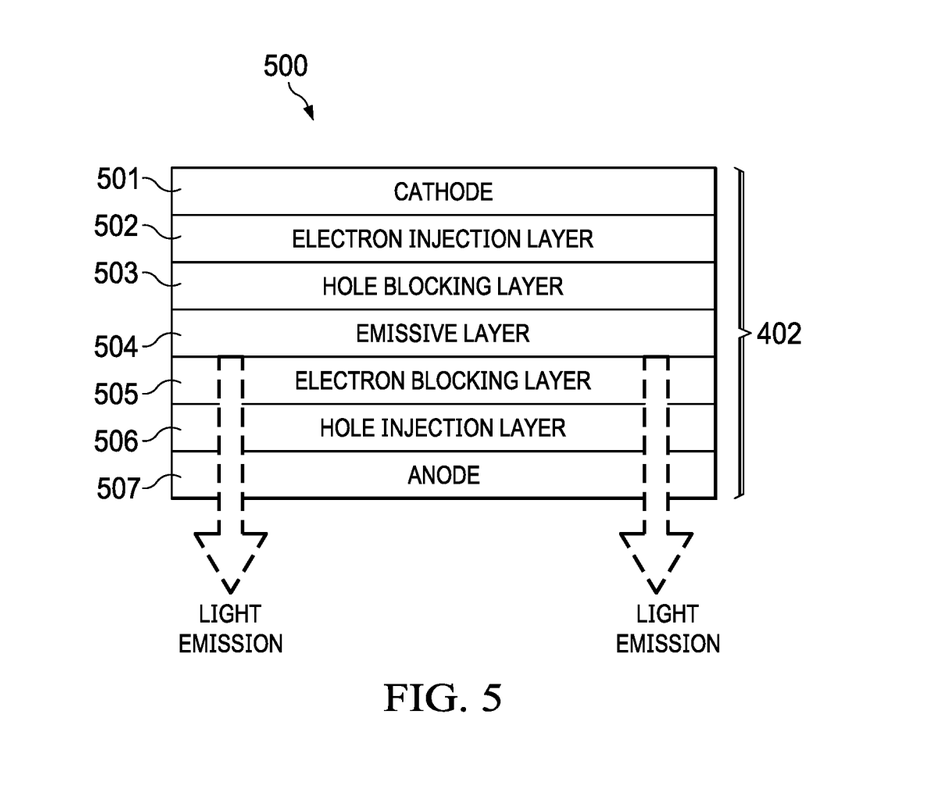
FIG. 5 is a block diagram illustrating layers of an example of an OLED stack, according to some embodiments.

FIG. 5 is a block diagram illustrating layers of OLED stack 402 within OLED firm 201 according to some embodiments. OLED stack 402 may be between about 100 to about 200 nanometers (nm) in width and may include cathode 501, electron injection layer 502, hole blocking layer 503, emissive layer 504, electron blocking layer 505, hole injection layer 506, and anode 507. Cathode 501 may inject electrons into emissive layer 504. Anode 507 may remove electrons.

Power is provided to OLED stack 402 via anode 507 and cathode 501. After power is applied, cathode 501 receives electrons from the power source and the anode removes them. The added electrons cause emissive layer 504 to be negatively charged while conductive layers 505 and 506 become positively charged. Positive holes jump boundary from conductive layers 505 and 506 to emissive layer 504. When a positive hole meets an electron, the two cancel each other out, thereby releasing a brief burst of electromagnetic energy in the form of light. This process occurs many times a second, causing OLED stack 402 to emit light when power is being applied to cathode 501 and anode 507.

FIG. 6 is a block diagram illustrating placement of privacy shield 113, according to some embodiments. As shown, focal point 601 of lens 111 is at focal length 602 from sensor 109. In this case, focal point 601 is at a center of lens 111. In other cases, however, focal point 601 may be between lens 111 and sensor 109. Although only one lens 111 is shown, in other embodiments, a plurality of concave or convex lenses may be used in combination and/or in series such that focal length 601 represents an effective focal length of a plurality of lenses.

Privacy shield 113 is deployed at selected distance 603 from lens 101 along a common axis. In some implementations, distance 603 may be equal to focal length 602. In other implementations, distance 603 may be greater than focal length 602.

The diameter of circular aperture 202 may be calculated based upon angular field of view 604 of camera 108 (and distance 603). In some cases, motor 112 may be coupled to both lens 111 and privacy shield 113, so that privacy shield 113 may move along with lens 111 (e.g., as a focus and/or zoom adjustment is being made). In some cases, motor 112 may move privacy shield 113 by an amount different than lens 111 to keep angular field of view 604 unobstructed by film 201 as focal length 602 changes. For example, motor 112 may move privacy shield 113 along the common axis by an amount greater than lens 111 during an auto-focus operation or the like. Alternatively, motor 112 may move privacy shield 113 by an amount smaller than lens 111.

Figure 7:
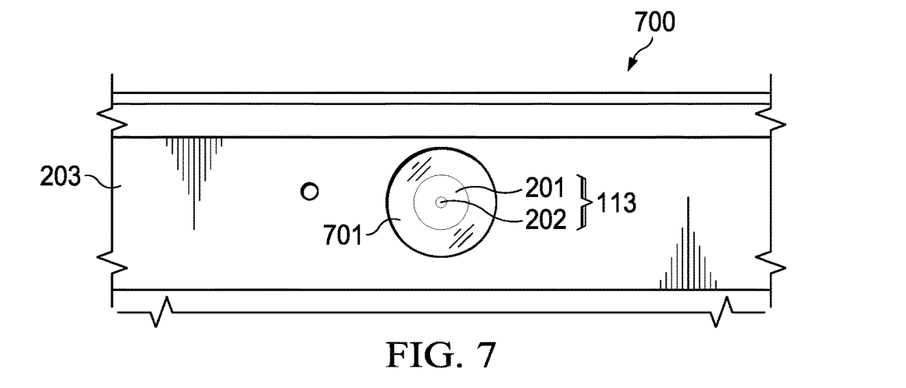
FIGS. 7 and 8 are diagrams illustrating examples of operations or states of a privacy shield, according to some embodiments.
Figure 8:
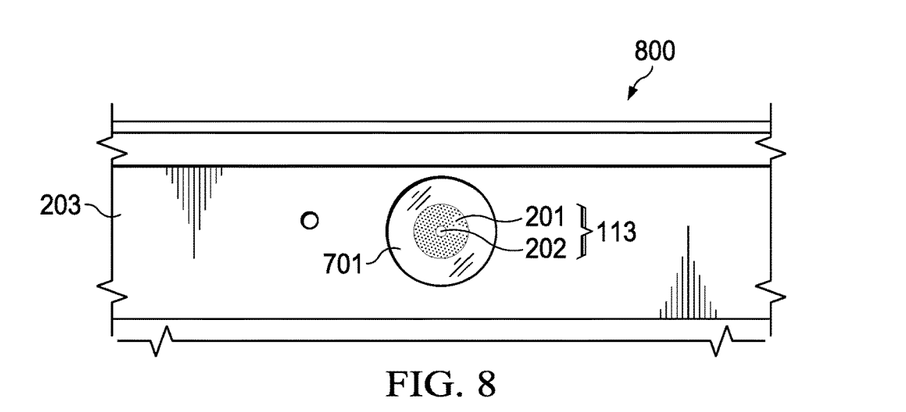

FIGS. 7 and 8 are diagrams 700 and 800 illustrating operation of privacy shield 113, according to some embodiments. Particularly, diagram 700 shows privacy shield 113 with the security or privacy feature turned off, such that transparent OLED film 201 is not illuminated. In some cases, bezel 701 may be provided for aesthetic purposes (e.g., to conceal electrical traces, etc.). Conversely, diagram 700 shows privacy shield 113 with the security feature turned on, such that transparent OLED film 201 is illuminated and saturates sensor 109. It should be noted that, in each case, circular aperture 202 remains a transparent, non-emitting portion of privacy shield 113, whereas OLED film 201 is only transparent when not illuminated.

As such, systems and methods described herein may provide a privacy shield comprising an OLED film at least partially shaped as a disc or ring around the focal point of a camera, at the focal length of the lens. A single (or multiple) pixels may be removed (or not present) at the focal point thus forming a circular aperture, and thereby allowing the camera to have good transmittance through the OLED film. The OLED film may be placed not at the focal length, but with sufficient aperture to allow for full image transmittance. In the case of an autofocus or zoom lens, a motor may maintain the privacy shield at the proper focal length distance across the adjustment range.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A privacy shield, comprising:
   a film configured to emit light; and
   a circular aperture in the film, wherein the privacy shield is configured to be deployed in front of a lens of a camera coupled to an Information Handling System (IHS), wherein the privacy shield is configured to be deployed at a distance from a focal point of the lens, and wherein the distance is selected, at least in part, based upon at least one of: an angular field of view of the camera, or a focal length of the lens.

2. The privacy shield of claim 1, wherein the film comprises an organic light emitting diode (OLED) film, and wherein the circular aperture comprises at least one of: glass, plastic, or transparent material.

3. The privacy shield of claim 1, wherein a diameter of the circular aperture is selected, at least in part, based upon an angular field of view of the camera.

4. The privacy shield of claim 1, wherein the lens comprises a convex lens.

5. The privacy shield of claim 1, wherein the lens comprises a concave lens.

6. The privacy shield of claim 1, wherein the film is configured to emit light in response to activation of a private mode of operation.

7. The privacy shield of claim 6, wherein the light is configured to saturate an image sensor deployed behind the lens.

8. The privacy shield of claim 1, wherein the focal point is at a center of the lens.

9. The privacy shield of claim 1, wherein the focal point is between the lens and an image sensor.

10. The privacy shield of claim 1, wherein the focal length comprises an effective focal length of a plurality of lenses.

11. The privacy shield of claim 1, wherein the privacy shield is configured to be coupled to an electronic motor configured to change the focal length of the lens.

12. The privacy shield of claim 11, wherein the electronic motor is configured to change the distance as part of an auto-focus adjustment.

13. The privacy shield of claim 11, wherein the electronic motor is configured to change the distance as part of a zoom adjustment.

14. An Information Handling System (IHS), comprising:
a processor;
a camera coupled to the processor, the camera comprising
a lens and an image sensor positioned behind the lens; and
a privacy shield coupled to the camera, the privacy shield comprising:
a film configured to emit light in response to activation of a privacy feature by the processor; and
a circular aperture in the film, wherein the privacy shield is positioned in front of the lens at a distance from a focal point of the lens selected based upon a focal length of the lens.

15. The IHS of claim 14, wherein a diameter of the circular aperture is selected, at least in part, based upon an angular field of view of the camera.

16. A method, comprising:
coupling a camera to an Information Handling System (IHS), the camera comprising a lens and an image sensor positioned behind the lens; and
coupling a privacy shield to the IHS, the privacy shield comprising:
a film configured to emit light in response to activation of a privacy feature; and
a circular aperture in the film, wherein the privacy shield is positioned in front of the lens at a distance from a focal point of the lens selected based upon a focal length of the lens.

17. The method of claim 16, wherein a diameter of the circular aperture is selected, at least in part, based upon an angular field of view of the camera.

* * * * *